United States Patent
Rouvellou et al.

(10) Patent No.: US 7,818,277 B2
(45) Date of Patent: *Oct. 19, 2010

(54) METHODS AND APPARATUS FOR BUSINESS RULES AUTHORING AND OPERATION EMPLOYING A CUSTOMIZABLE VOCABULARY

(75) Inventors: Isabelle M. Rouvellou, New York, NY (US); Hoi Y. Chan, Stamford, CT (US); Louis R. Degenaro, White Plains, NY (US); Judah M. Diament, Bergenfield, NJ (US); Achille B. Fokoue-Nkoutche, White Plains, NY (US); Charles A. Kerr, Jr., Somers, NY (US); Mark H. Linehan, Yorktown Heights, NY (US); Arvind Rajpurohit, Elmsford, NY (US); Samuel M. Weber, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/236,310

(22) Filed: Sep. 23, 2008

(65) Prior Publication Data

US 2009/0018822 A1    Jan. 15, 2009

Related U.S. Application Data

(63) Continuation of application No. 10/725,352, filed on Dec. 1, 2003, now Pat. No. 7,444,314.

(51) Int. Cl.
*G06N 5/02* (2006.01)
(52) U.S. Cl. .............................. 706/47; 706/45; 706/46
(58) Field of Classification Search ............. 706/45–47; 717/108; 705/1
See application file for complete search history.

(56) References Cited

U.S. PATENT DOCUMENTS

| | | | |
|---|---|---|---|
| 5,701,400 A * | 12/1997 | Amado ........................ | 706/45 |
| 6,826,579 B1 * | 11/2004 | Leymann et al. ............. | 717/131 |
| 6,965,889 B2 * | 11/2005 | Serrano-Morales et al. .... | 707/1 |
| 7,020,869 B2 * | 3/2006 | Abrari et al. ................. | 717/108 |
| 2002/0198856 A1 * | 12/2002 | Feldman et al. ............... | 706/47 |
| 2003/0221184 A1 * | 11/2003 | Gunjal et al. ................ | 717/118 |
| 2004/0260667 A1 * | 12/2004 | Huelsman et al. ............. | 706/47 |

* cited by examiner

*Primary Examiner*—Donald Sparks
*Assistant Examiner*—Omar F Fernandez Rivas

(57) ABSTRACT

In one embodiment, a method comprises creating at least one individualized language resource, creating at least one individualized language rule referencing at least one of said individualized language resource, and transforming said at least one individualized language rule into computer executable format.

10 Claims, 13 Drawing Sheets

METHODS AND APPARATUS FOR BUSINESS RULES AUTHORING AND OPERATION EMPLOYING A CUSTOMIZABLE VOCABULARY

CROSS REFERENCE TO RELATED APPLICATIONS

This application is a continuation of U.S. patent application Ser. No. 10/725,352, filed Dec. 1, 2003 now U.S. Pat. No. 7,444,314, which is herein incorporated by reference in its entirety.

BACKGROUND OF THE INVENTION

1. Field of the Invention

The present invention generally relates to distributed application systems. More specifically, the present invention relates to methods and apparatus for business rules authoring and operation employing a customizable vocabulary in distributed application systems.

2. Description of the Related Art

Rules engagement is a well known and important technique for the governance of distributed application systems. Rules are codified and rules systems are managed by programmers. A significant problem is that non-programmers are unable to participate in the management of distributed application systems due to the technical expertise rules systems require.

Business users have a variety of backgrounds and expertise levels. For the most part, business users are not computer programmers, though some have become quite adept at programming due to desire and/or need. Computers have come to benefit the technically savvy, but have only aided others through application software and their interfaces.

Historically, to author business logic executable by a computer required that either a business user learn a computer language created by programmers for programmers, or that a programmer interpret the wishes and desires of a business user into a computer language. The programmer-friendly computer language statements are subsequently compiled into computer executable format. To date, the vast majority of business users are not fluent with computer programming languages, nor is this likely to change.

One exemplary software application category is the spreadsheet, where the user can, for example, enter formulas to assign values to cells in a grid. However, spread-sheets are generally single user systems and do not scale as distributed enterprise applications. Further, spreadsheets generally have their own language for user interaction, where nouns and verbs are statically built-in for formula authoring. For example, to add the cells d1, d2 and d3 and place the sum in cell d4, the formula for cell d4 might be: =sum(d1:d3).

It would be desirable to provide a rules system that empowers "business users" (non-programmers) to administrate distributed application systems.

SUMMARY OF THE INVENTION

In one embodiment according to the present invention, methods and apparatus for authoring and executing an individualized language business rule are provided. In one embodiment, a method comprises creating at least one individualized language resource (also referred to as an individualized vocabulary term), creating at least one individualized language rule referencing at least one of said individualized language resource, and transforming said at least one individualized language rule into computer executable format. An individualized vocabulary term could be one provided through custom vocabulary building, described herein with respect to FIG. 2, or one built-in to the system.

An advantage of the present invention is a method for the composition and employment of a customized vocabulary of resources, which are expectedly defined by programmers under the direction of business user advocates. This step transforms entities from a programmer's world to a business user's world, enabling business users to manipulate entities in their own terms (e.g., individualized language). The original entities are known as actual resources (ARs), and the transformed entities are known as virtual resources (VRs). See U.S. patent application Ser. No. 10/665,564, entitled "Virtual Resources Method, System and Service," to Degenaro et al., filed Sep. 22, 2003, which is incorporated herein by reference.

Another advantage of the present invention is a method for the composition and employment of individualized language-based rules and rule sets that interact with resources from a customized vocabulary. This method permits non-programmers to express the desired tests and actions that should be performed using individualized language. The present invention essentially grants non-programmers the ability to program using an individualized language instead of having to learn a programmer-oriented language.

Another advantage of the present invention is the capability to transform individualized language authored rules into computer executable format. This permits the business user rules, expressed in individualized language terms, to be performable by machine execution. The translation is from individualized language format to one or more target execution engine formats. A code generator can produce artifacts suitable for Java, IBM's Agent Building and Learning Environment (ABLE), C++ and other targets.

Yet another advantage of the present invention is the means to deploy and execute code that carries out a business user's individualized language instructions. Once deployed, applications that have been extended to employ rules are influenced by expressions written in individualized language by a business user without any need for programmer assistance.

An advantage of the present invention is the capability to organize resources from a customized vocabulary and individualized language rules into individualized language rule sets comprising inputs and outputs, and one or more rules all specified by the business user using individualized language.

Another rule authoring advantage is the ability to create (compose) an individualized language rule template based on a previously authored rule. A still further rule authoring advantage is the ability to author an individualized language rule by completing an individualized language rule template.

Another advantage of the present invention is the ability of the template/rule/rule set authoring component to enforce correct individualized language syntax, so that authors cannot make a syntactical mistake. This ensures that whatever a business user authors can indeed be executed by a runtime.

Another advantage of the present invention is the facility to scope template/rule authoring based on rule set input and output groups.

Yet another advantage of the present invention is the capacity to represent customized vocabulary resources and individualized language templates, rules and rule sets in a persistent externalized XML Metadata Interchange (XMI) format that can be interrogated and manipulated by other components.

A further advantage of the present invention is a facility to create application program type-safe linkage and registration, based on the resources from a customized vocabulary used as inputs and produced as outputs, for a desired individualized language rule set model.

Another advantage of the present invention is the means to deploy artifacts suitable for runtime of individualized language rule set selection based upon externalized criteria, such as time. For example, from 2003/01/01-2003/12/31 the link from the application will be to individualized language rule set "A," whilst from 2004/01/01 and beyond the link will be to individualized language rule set "B." This permits a type-safe level of indirection for individualized language rule set selection.

Another advantage of the present invention is the ability for applications to employ individualized language rules to influence their behavior. This is made possible by extending (placing type-safe linkage artifacts produced by the present invention within, e.g. PoVs) applications with requests for individualized language rule-based guidance, which may either directly or indirectly cause one or more individualized language rules to be triggered.

Yet another key advantage of the present invention is the ability to coordinate and cooperate with other rules engines in the runtime execution.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION

Embodiments according to the present invention provide methods and apparatus for business rules authoring and operation employing a customizable vocabulary in distributed application systems.

One embodiment allows non-programmers to author logic directly carried out by a computer utilizing an individualized language. An individualized language is a combination of permissible statements (e.g., if-then-else or the like) and a customizable vocabulary upon which these statements operate.

The present invention offers a powerful business solution enabling non-programmers to author rules while in accordance with existing programming models and tools. It extends the audience for middleware solutions by reaching out to non-information technology personnel. It builds upon previous work related to externalization, and minimizes initial investment required by enabling re-use of existing code bases without modification. It provides language and infrastructure to address a range of rule author abilities, from little or no skills to very skilled.

It allows for application rule-influenced behavioral and content changes to be dynamically effective (e.g., without restarting) at minimal cost in terms of performance and instrumentation. All these benefits result from the teachings of the preferred embodiments contained herein.

Figure 1:
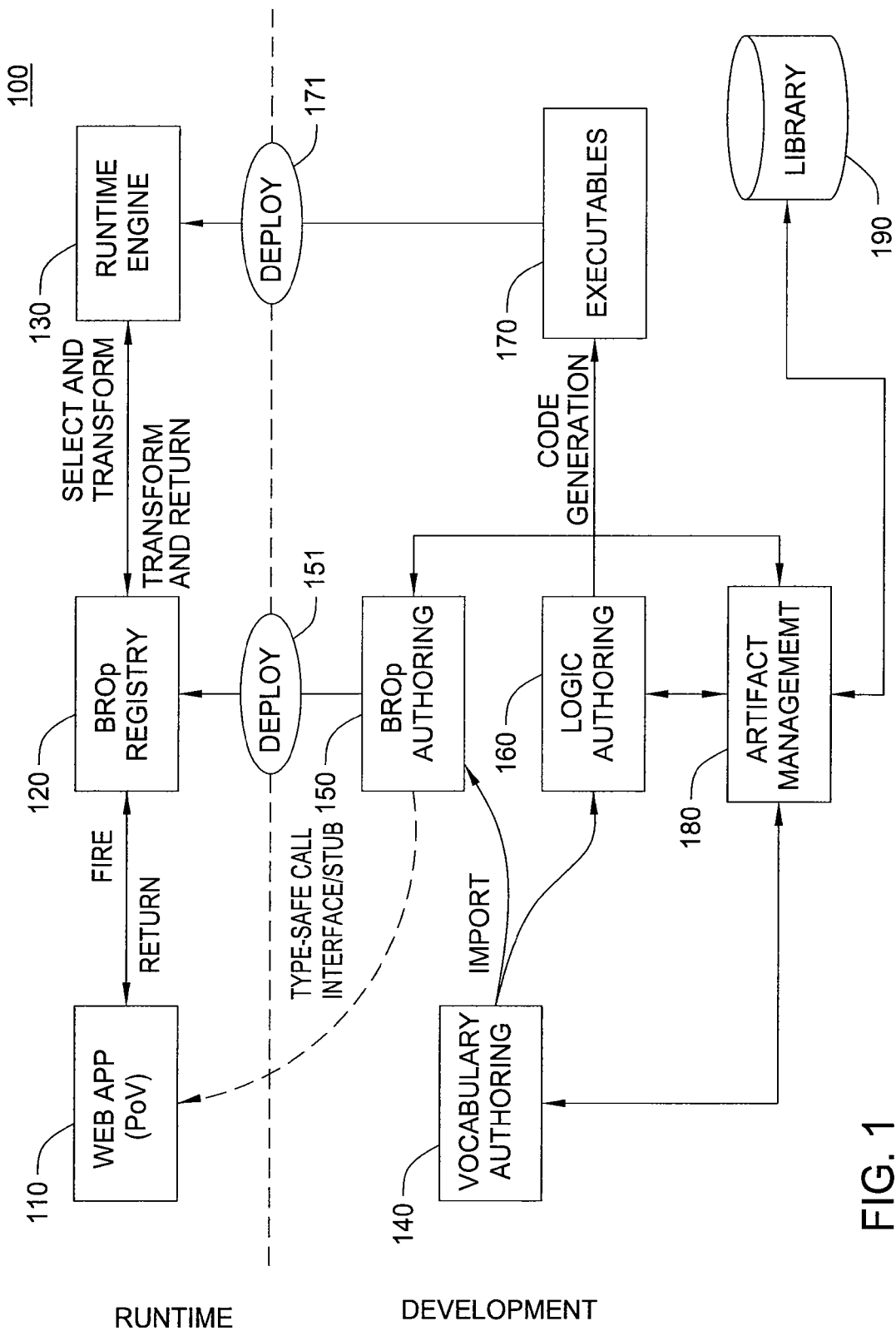
FIG. 1 is a block diagram showing various components according to one embodiment of the present invention.

Referring now to FIG. 1, a block diagram shows one embodiment of the constituent parts of an apparatus for Business Rules Authoring and Operation Employing a Customizable Vocabulary 100 system. Relationships among various components or software modules comprising one exemplary embodiment according to the present invention are illustrated. The components comprise two types - runtime and development. The top area of FIG. 1 relates to the runtime environment (when a user or application is going to actually employ what has been written in terms of rules). The bottom area relates to how a user actually authors rules that can ultimately be used in the runtime environment.

The runtime components include an Extended Application 10, in this example a Web application containing at least one Point of Variability (PoV), Business Rule Operation (BROp) Registry 120 and Runtime Engine 130. The development components include a Vocabulary Authoring 140, a BROp Authoring 150, a Logic Authoring 160, a Code Generation to Executables 170, an Artifact Management 180 and a Library 190. These components are discussed herein. With respect to FIG. 1, the general purpose and responsibilities of each component will be discussed.

Regarding runtime, an Extended Application 110 is one that has some of its behavior and/or data (i.e., state) influenced or provided by externalized function preferably authored using the development and deployment facilities of the present invention. It contains at least one PoV, and a type-safe mechanism for coupling an application ultimately to a Runtime Engine 130 component. Type-safe PoVs are produced by a BROp Authoring component. Extended Applications 110 (ones in which are placed type-safe linkage artifacts produced by the present invention, e.g. PoVs) are deployed with the PoVs that they utilize at runtime.

A PoV is a code element implementing an interface enforcing a type-safe contract between an Extended Application 110 and a "Business Rule Operation" (BROp) contained within the BROp Registry 120. For example, a BROp named "CalculateDiscount" may require an "Order" and a "Customer" as input producing a "DiscountList" as output. Any PoV corresponding to BROp "CalculateDiscount" would have the same input and output requirements enforced at compile time (and therefore at runtime). Hence, any extended application 110 employing a PoV corresponding to BROp "CalculateDiscount" specifies "Order" and "Customer" input types at compile time (and therefore corresponding objects at runtime). Similarly, the output, if received, would be a DiscountList. Failure to specify the correct type or provide the correct object results in a compile time error (or less preferred a runtime exception).

A BROp Registry 120 component provides a means to mediate PoV connections between an Extended Application 110 and available externalized functions of a Runtime Engine 130 component. At runtime, the PoV 110 passes both selection and evaluation criteria to the BROp Registry 120 component. The BROp Registry 120 component utilizes the selection criteria to choose a Runtime Engine 130 externalized function for evaluation, passing along the evaluation criteria and returning any results.

The indirection mechanism introduced by a BROp Registry 120 facilitates choice of externalized function employed according to selection criteria. Alternatively, though not always recommended due to possible inflexibility, the Extended Applications 110 can link directly to particular externalized functions of a Runtime Engine 130 component, or can link in a non-type-safe manner.

In one embodiment, the BROp Registry 120 is initially populated by deployment of BROp Authoring 150 artifacts prior to runtime. The BROp Registry 120 entries comprise information about selection criteria, evaluation criteria and associated Runtime Engine 130 externalized functions. For example, a BROp Registry 120 entry may be such that if the date is prior to Jan. 1, 2000, then the Runtime Engine 130 externalized function named "CalculateDiscountVersion1.0" is chosen. Otherwise, Runtime Engine 130 externalized function named "CalculateDiscountVersion2.0" is chosen. More complex multivariate selections are possible, as are chains of selections.

The BROp Registry 120 can be dynamically updated while the Extended Application 110 is executing, thus allowing dynamic behavioral and/or data changes. For example, an existing BROp Registry 120 entry for "CalculateDiscountVersion1.0" may be changed to be effective only prior to Jan. 1, 1999. Such changes are carried out within transactional boundaries in order to assure consistency for processes already in progress.

The Runtime Engine 130 component is a registry of executable externalized functions that is preferably employed by Extended Applications 110 indirectly through a BROp Registry 120. The Runtime Engine 130 registry is initially populated by deployment of Code Generation to Executables 170 artifacts prior to runtime.

Normally, the externalized functions in a Runtime Engine 130 represents an executable form of the wishes and desires specified by a business user (non-programmer) by virtue of utilizing a Logic Authoring 160 component, followed by Code Generation to Executables 170 and transaction protected Deployment 171, taking into account the target runtime execution engine(s).

A Runtime Engine 130 externalized function comprises a representation of a set of one or more nodes, each with well-defined inputs and outputs. The initial inputs from the PoV (or their transformations) are directed to a start node, and the results returned to the PoV (or their transformations) are provided by the end node. The start and end nodes may be one and the same. In between, the inputs and outputs of intermediate nodes are well-defined (e.g., type-safe), such that each node knows exactly what types to expect as input and what types are produced as output.

Each individual node within the flow may have been created by virtue of a business user's authoring activities, or may be a "black box" plug-in. Runtime execution of a flow proceeds from its start node, consuming the PoV provided type-safe inputs, through intermediate nodes, if any, to its end node which provides the type-safe output expected by the PoV.

In one embodiment, the "black box" plug-in may be one or more other runtime engines coupled to the Runtime Engine 130. For example, a vocabulary term might be defined utilizing the Vocabulary Authoring 140 component. The vocabulary term would really indicate execution on another rules platform. Use of the vocabulary term by Logic Authoring 160 followed by Code Generation to Executables 170 and Deployment 171 would result in the Runtime Engine 130 provision for coordinating and cooperating with other rules engines in a runtime environment. As such, the vocabulary term represents execution of one or more non-individualized rules on another rules platform.

Thus, at runtime a PoV within an Extended Application 110 employs a BROp Registry 120 to connect with a Runtime Engine 130 externalized function, which evaluates type-safe provided input and returns type-safe output.

Figure 4:
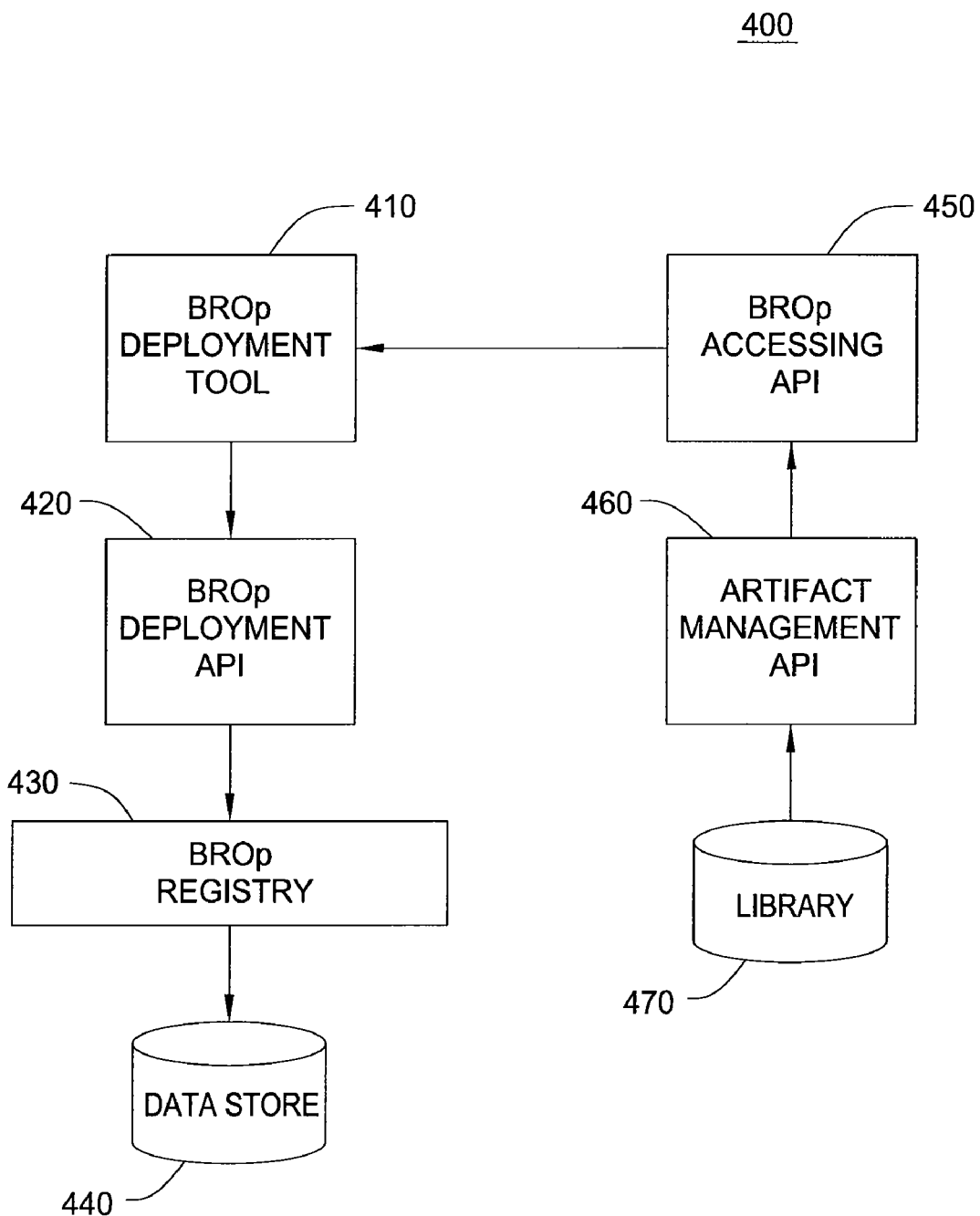
FIG. 4 is a block diagram showing an application connectivity deployment component.
Figure 5:
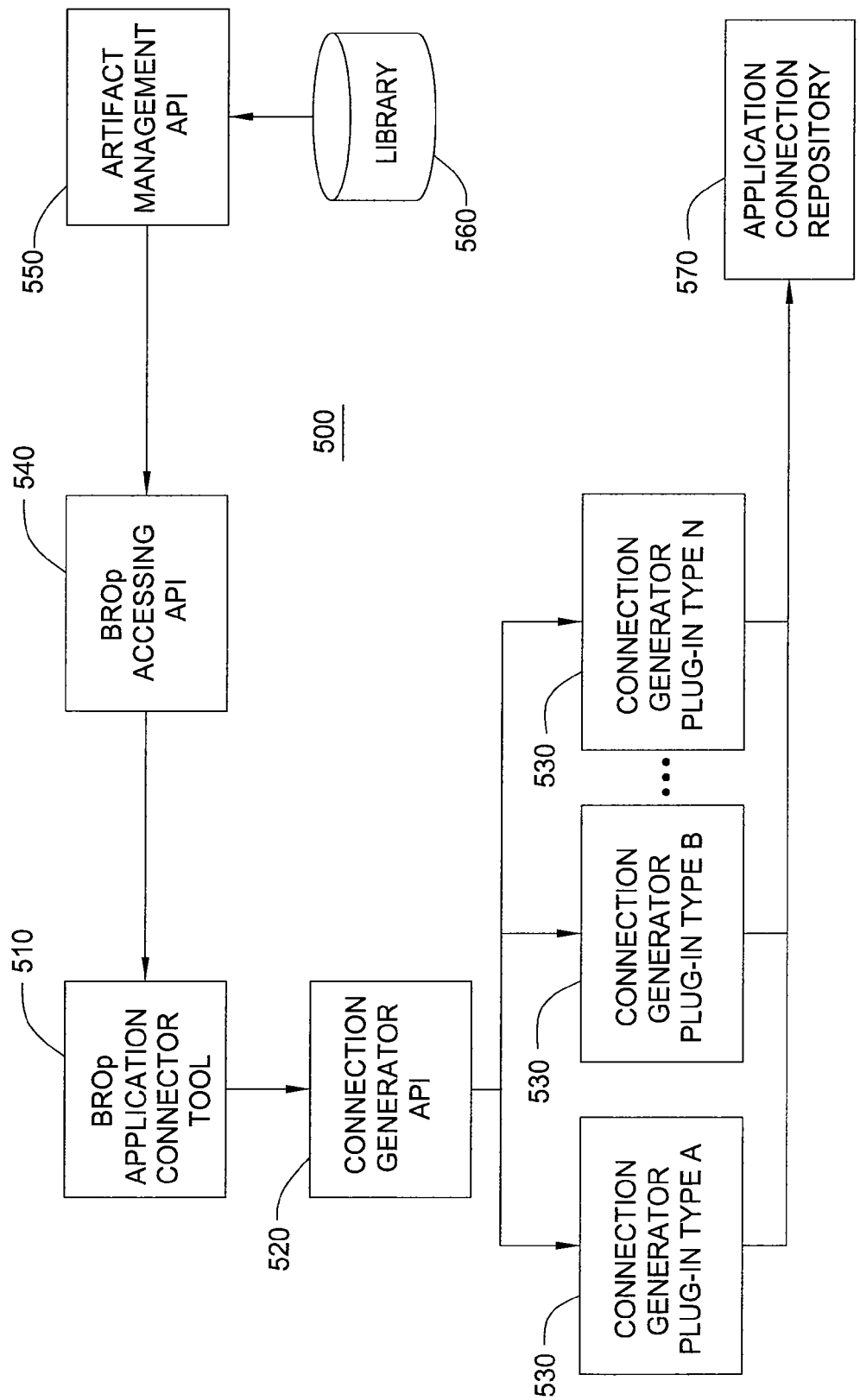
FIG. 5 is a block diagram showing an application connection generator component.
Figure 10:
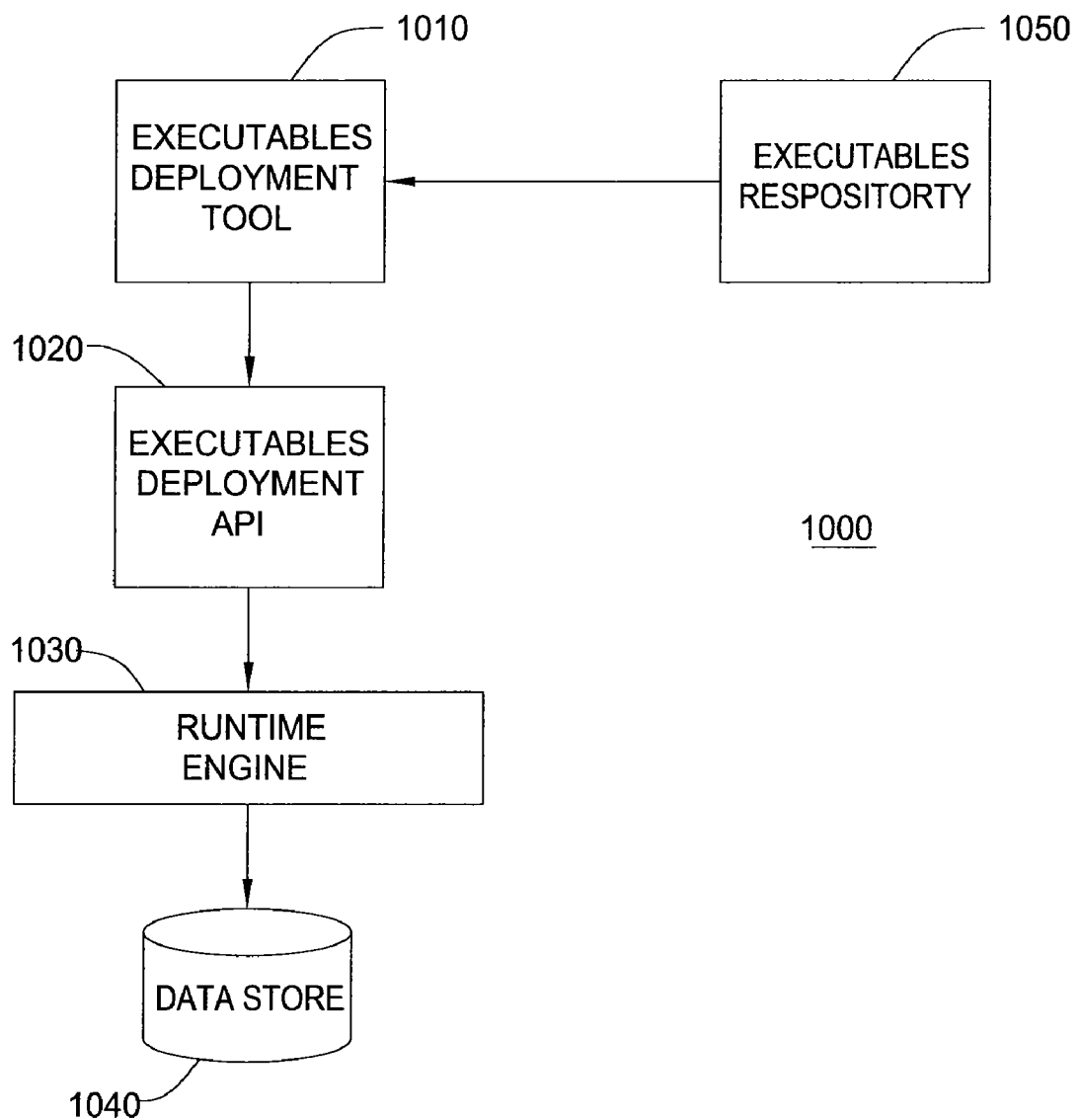
FIG. 10 is a block diagram showing executable deployment component.

These and other aspects of the Business Rules Authoring and Operation Employing Customizable Vocabulary 100 system runtime components including the Extended Application 110, the BROp Registry 120 and the Runtime Engine 130 are described in more detail with respect to FIGS. 4-5 and 10.

Regarding development time, the Vocabulary Authoring 140 component is utilized to create and maintain a vocabulary of terms and mappings to their executable implementations. The Vocabulary Authoring 140 component facilitates the transformation of existing artifacts (e.g., executable objects) that programmers create into terminology that a business user (or other target audience) understands, while at the same time mapping onto executable entities. The result of this Vocabulary Authoring 140 component comprises new artifacts enabling a user to write rules employing those executable objects but using the target audience terminology defined in the Vocabulary Authoring 140 component.

The Logic Authoring 160 component can present to the end-user a user interface (UI) that would allow the end-user to examine this vocabulary and write logic (e.g., if-then statements or the like) about the underlying objects using business user terminology. For example, the logic might include "if the Customer Order is greater than $100.00 then give Customer a ten percent discount." This is just one example of logic that a business user can specify in business user terms from this custom-built vocabulary.

Vocabularies are employed by the BROp Authoring 150, the Logic Authoring 160, and the Code Generation to Executables 170 components. A vocabulary can be defined in various different ways (separately or in combination) such as by examination of models (e.g., Unified Modeling Language (UML), etc.), by examination of compiled code classes and archives (e.g., Java archive (JAR) files, etc.), by imagination (e.g., without any pre-existing mapped-to artifacts), and by any other suitable manner. Those skilled in the art can contemplate other sources of information that may be used for vocabulary definition.

A vocabulary can be defined with a target logic authoring audience in mind. For example, there may be a common object defined in the programmer's world known as "Customer." A vocabulary may call for representing "Customer" as "Insured" for insurance rule authors, as "Investor" for banking rule authors, as "Patient" for heath care rule authors, as "Driver" for automobile rental agency authors and so forth. These and other aspects of the customized Vocabulary Authoring 140 component are described in more detail with respect to FIG. 2.

A BROp Authoring 150 component is utilized to create and maintain a registry of logical operations to externalized function mappings and transformations, and to assist with type-safe extension of rule-enabled applications. A vocabulary provided by the Vocabulary Authoring 140 component is employed to define logical operations and their expected input and output. Definition of a logical operation also includes association with one or more externalized functions in a Runtime Engine 130 component, based upon selection criteria.

For example, a BROp named "CalculateDiscount" may require an "Order" and a "Customer" as input and produce a "DiscountList" as output. The BROp may be associated with one or more externalized functions having matching input, output and purpose. The BROp may also be associated with externalized functions having non-matching input and/or output by way of transformers that correct the mismatch. These and other aspects of the customized BROp Authoring 150 component are described in more detail with respect to FIGS. 3-5.

The BROp Authoring component 150 allows for indirections, transformations and type-safe linkages. Thus, the Extended Application 110 does not have to directly call a particular authored rule set, but instead may invoke a logical operation (e.g., BROp). For example, an application may choose to utilize a particular BROp that in turn employs "Ruleset A" on Tuesdays, "Ruleset B" on Thursdays and "Ruleset C" otherwise. The BROp Authoring component 150 employs a vocabulary defined using a Vocabulary Authoring component 140 in order to setup a schedule of rule sets, and to define a signature (or a contract). Applications adhering to that signature can indirectly execute one of the rule sets that have been authored by a business user in a type-safe manner.

The BROp authoring component also allows for inexact matches, performing transformations necessary in order to make correct linkages between applications and rule sets. For example, an application my supply an Integer value as input and expect a String value as output. The BROp may accept that signature, and do a transformation to link with a rule set that takes a Float value as input producing a String value as output.

In other systems, data, consisting of various objects, is passed between the Application and the Runtime Engine. Traditionally, this data is merely bundled together ad hoc and transported as-is. Unfortunately, this creates serious problems because the Runtime Engine invariably has to make assumptions about the types of the objects it expects to receive from the Application, and vice-versa. All too often the objects that are actually sent are of the wrong types. Other systems do not provide any way of preventing wrong types passing, with consequences that failures occur during execution which are very difficult to recover from. The present invention provides type-safety, which assures that the objects that are exchanged are of the expected types.

In embodiments according to the present invention, even though object arrays are passed by the linkage mechanism, what is presented to the Extended Application 110 is a compile time checked type-safe signature that it must adhere to, customized for a particular situation. This assures that the Runtime Engine 130 will receive exactly the correct object types.

The result of the logic authoring, described herein, is that the system generates executable code that will interrogate and manipulate the objects that were specified in the Vocabulary Authoring 140 component. The system produces deployable to runtime artifacts by way of component Code Generation to Executables 170, shown in FIG. 1. The deployable artifacts (executables) are Deployed 171 to a Runtime Engine 130.

The Logic Authoring 160 and Code Generation to Executables 170 components are utilized to create and maintain a collection of business user specified expressions (e.g., "Rule Sets," "Rules," "Templates," etc.) using a customized vocabulary defined previously through the Vocabulary Authoring 140 component.

The intent is for the Logic Authoring 160 component to enable non-programmers to author business logic that can be directly executed or transformed into an executable form of the Code Generation to Executables 170 component without programmer assistance. This is facilitated by presenting a palette of vocabulary terms customized to the business user for use in an authoring environment that ensures syntactical (but not semantic) correctness of logic.

Figure 12:
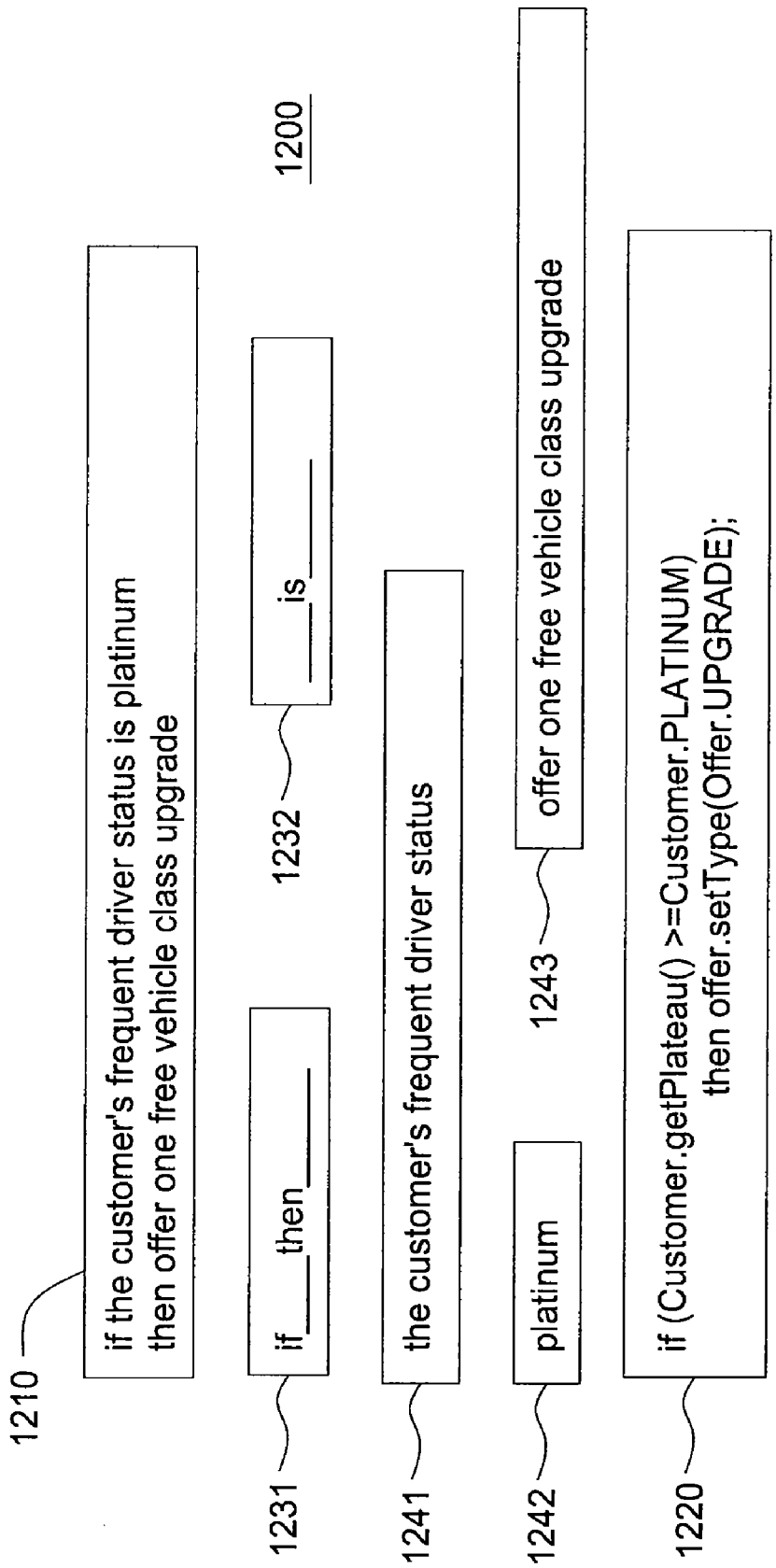
FIG. 12 is a block diagram showing exemplary individualized language sentence, fragments and corresponding generated code.

Referring now to FIG. 12, an example "business" user authored statement comprising terms from a customized vocabulary 1210 is shown. This is an actual statement that a "business" user might construct using the Logic Authoring 160 (of FIG. 1) component.

An example "business" user authored statement 1210 comprising terms from a Customized Vocabulary (1231, 1232, 1241, 1242, 1243) is shown. Exhibited are sample built-in sentence fragments 1231 and 1232 and sample user defined customized vocabulary terms 1241, 1242, and 1243, all of which can be manipulated by the "business" user to form syntactically correct statements, such as 1210, using the Logic Authoring 600 (of FIG. 6) component. These syntactically correct statements can then be transformed into executable form, such as Computer Code 1220, by way of the Code Generation Tool 910 (of FIG. 9).

An executable statement 1220, corresponding to the actual statement, is generated from the "business" user authored statement 1210 utilizing the Code Generation to Executables component 170 (of FIG. 1) component.

Referring once again to FIG. 1, these and other aspects of the Logic Authoring 160 and Code Generation to Executables 170 components are described in more detail with respect to FIGS. 6-9.

An Artifact Management 180 component and a Library 190 component provide means to manage the various artifacts lifecycle operations (create, retrieve, update, and delete) employed by the other individual components. They interface to version controlled repositories, assure consistency between related artifacts, and assist in searching for artifacts. The Artifact Management 180 component is essentially a persistence mechanism and a management mechanism for ensuring that information is not lost and ensuring that various components coupled to each other are inter-compatible. The Artifact Management component saves information in non-volatile storage, performs correctness checking, provides artifacts versioning, and enforces compatibility across all components.

These and other aspects of the Artifact Management 180 and Library 190 components are described in more detail with respect to FIGS. 2-6 and 8-9.

The various components comprising the Business Rules Authoring and Operation Employing a Customizable Vocabulary 100 system may be plugged-in to a development environment software package that in turn interacts with one or more users via a display, keyboard, mouse and other computer peripherals.

Figure 2:
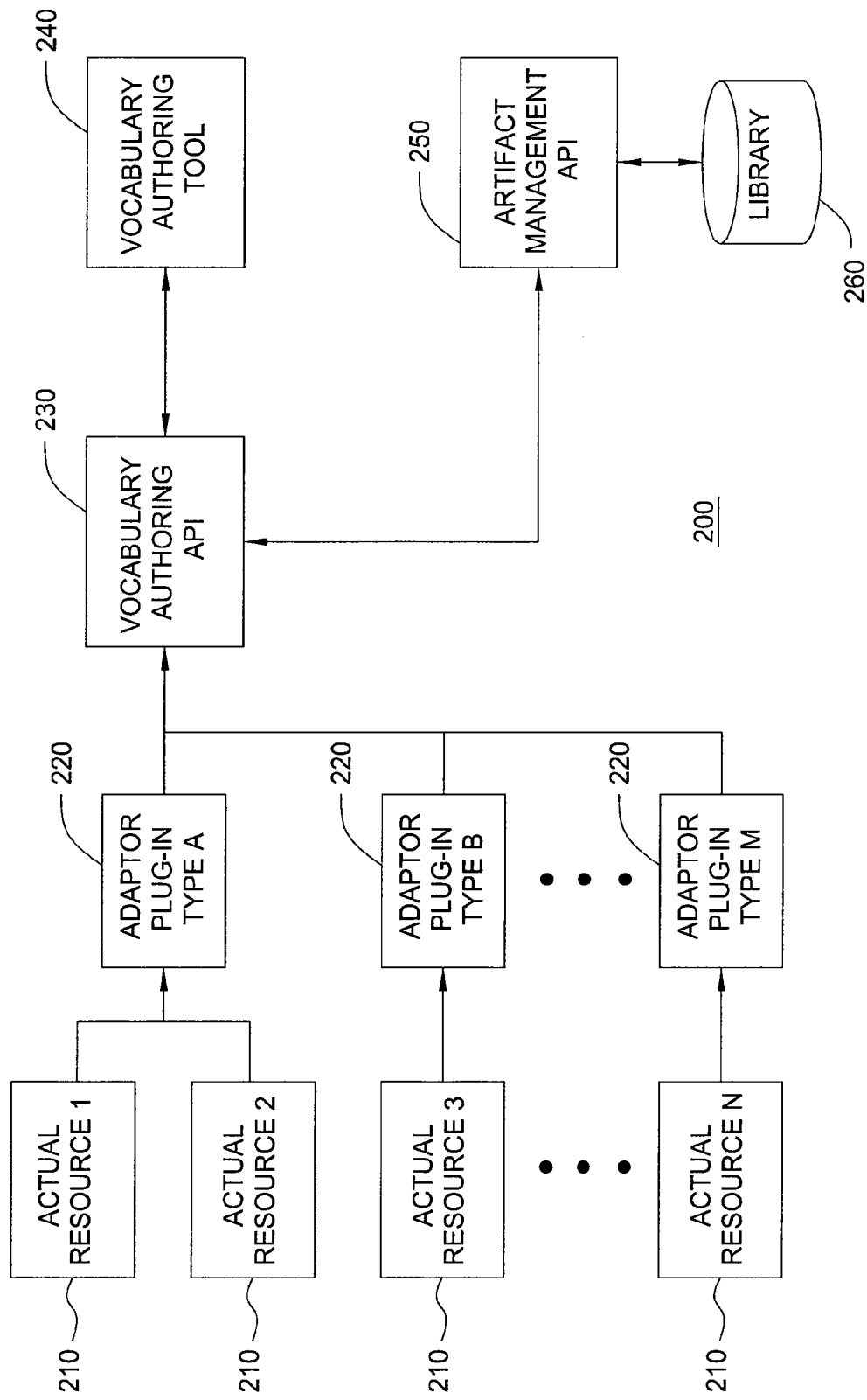
FIG. 2 is a block diagram showing a vocabulary definition component.

Referring now to FIG. 2, a block diagram shows one embodiment of the constituent parts of a Vocabulary Authoring 200 (also, Vocabulary Authoring 140 component of FIG. 1) component. Shown are Actual Resources 210 here named 1-N, which are not a part of the Vocabulary Authoring 200 component, but rather are entities that may be employed at runtime subject to and/or assisting with execution of "business" user authored logic. Such entities may be UML models, Java class files, JAR files, C++ class files, a customer object, an order object and so forth. The system imports and examines the Actual Resources 210.

The present invention provides an API and tool to build domain specific customized vocabulary terms (nouns, verbs, and sentence fragments) which are made available for other components. The vocabulary terms are the virtual resources utilized by other components to author rules, connectors, and perform code generation (or interpretation) for execution. A few resources are built in. The customized vocabulary is comprised of the built in resources and the results of reverse engineering of existing artifacts producing default meta-data, which can then be altered to suit the intended audience. The meta-data provides both a view on actual resources for presentation to a target audience and a deterministic mapping to actual resources for implementation. The same actual resources can be used to produce one or more virtual resources, each with a target audience in mind. Virtual resources can be further classified into domains for ease of management and presentation.

Along with representing attributes and methods, the present invention facilitates representation of relationships between virtual resources. For example, a virtual resource (vocabulary term) might be "Order" which might have a method that returns the associated "Customer". A "can be reached" relationship virtual resource can be created that allows for navigation from an "Order" to a "Customer". Other more complicated relationships, derived or explicitly constructed, can also be established.

Rule Sets and Rules produced by the present invention may be given identities and may themselves be virtual resources.

The system allows a user to then build a virtual representation of the Actual Resources 210 (i.e., the system allows the user to define a vocabulary). If one of the objects was "Order" and it had a method on it "getNumberOfObjectsOrdered" or the like, the actual method name would not necessarily have to be displayed to the end-user. Rather, a more user-friendly name could be assigned and used. Moreover, if there are some methods, etc., that a particular audience should not see, the system can hide the methods from that audience. Basically, the system is creating a view of one or more objects and allowing them to be put into a particular domain (i.e., allowing them to be grouped in a particular way). In one embodiment, the system exposes and renames only those items that are relevant to the target audience, and names them in a user-friendly way.

The present invention significantly differs from other systems in that a vocabulary term need not be linked directly to a particular implementation. The present invention facilitates complex and deterministic mapping of vocabulary terms onto executable objects, not just simple textual substitutions of English text for an object attribute, method, or parameter name. A business user may wish have a vocabulary term comprising the sum of two individual object method invocations. For example, the present invention permits a virtual method to be called "the client's monthly benefits income" and implemented as: client.getMonthlyRetirementIncome( )+client.getMonthlySocialSecurityIncome( ). The present invention places no additional requirements on actual resources. For example, on existing classes no new interface need be implemented to support virtual resources—each can be used "as is".

Also shown are import Adapter Plug-in 220 Types A-M. For each type of Actual Resource 210 to be imported by a Vocabulary Authoring 200 component, a suitable Adapter Plug-in 220 is required. Some Adapter Plug-ins 220 may handle more than one Actual Resource 210 type. For example, Adapter Plug-in Type A 220 may be one that handles both Java class files and JAR files, while Adapter Plug-in Type B 220 may only handle C++ class files.

The purpose of Adapter Plug-ins 220 is to make available to the Vocabulary Authoring 200 component the various available attributes and methods of the corresponding instances of Actual Resources 210 of interest to the Vocabulary Authoring 200 component user.

The Vocabulary Authoring Application Programming Interface (API) 230 provides the means for a Vocabulary Authoring Tool 240 to import Actual Resource 210 information and to manage Virtual Resources (not shown; see U.S. Patent having and entitled "Virtual Resources Method and Service," to Degenaro et al., filed Sep. 22, 2003) lifecycle operations via the Artifact Management API 250 persistently stored in a Library 260.

Figure 11:
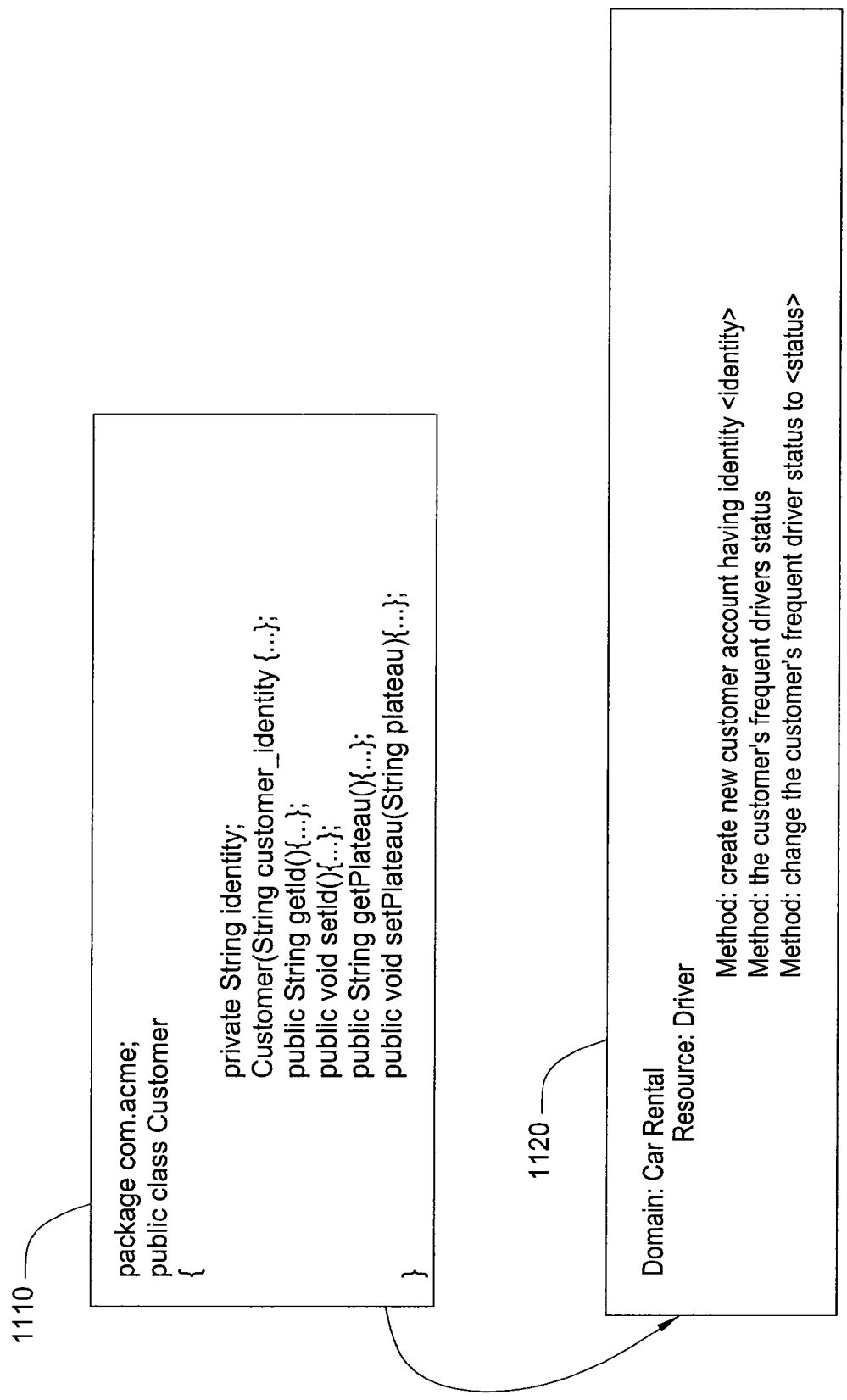
FIG. 11 is a block diagram showing exemplary corresponding actual and virtual resources forming a customized vocabulary component.

The Vocabulary Authoring 200 component can be used to define a customized vocabulary based upon existing entities. With reference now to FIG. 11, an Actual Resource 1110 (computer code) and a corresponding Virtual Resource 1120 (the code transformed into a vocabulary that a business user might see) derived from it using the Vocabulary Authoring 200 (of FIG. 2) component are illustratively shown. As can be seen, a domain "Car Rental" has been assigned to the Virtual Resource 1120. The Actual Resource 1110 class "Customer" corresponds to Virtual Resource 1120 "Driver." Private attribute "identity" and public methods "getId" and "setId" have been suppressed in Virtual Resource 1120, and public methods "Customer," "getPlateau," and "setPlateau" have been renamed to "create new customer account having identity <identity>," "the customer's frequent driver status" and "change the customer's frequent driver status to <status>," respectively. Relationships between Virtual Resources (not shown) can also be defined.

Referring back to FIG. 2, a customized vocabulary can be created using the Vocabulary Authoring 200 component, where nouns, verbs and sentence fragments are terms suitable to a target audience (e.g., "business" user) and the implementations are programmer manufactured entities suitable to an electronic computer execution environment. These nouns, verbs and sentence fragments are more comfortable for the target audiences (e.g., non-programmers) to work with when performing various tasks associated with other components of the present invention.

Many different customized vocabularies can be constructed from the same or different sets of Actual Resources 210. Actual Resources 210 need not already exist when creating a customized vocabulary, as the association of nouns, verbs, and sentence fragments with actual implementations can be made subsequent to logic authoring, but prior to code generation. Moreover, there is no restriction on mapping, such as one to one, between virtual and actual resources. A virtual resource may employ multiple actual resources. Also, virtual resources need not transparently expose actual resource features. A virtual resource may supply certain information, such as one or more parameters to an actual method, relieving the business user from such obligations. For example, an actual resource method might require a String county_of_residence parameter for County of Residence, but the virtual resource may, perhaps through a relationship, be able to automatically obtain that information. Thus, the virtual resource may obviate the business user from supplying the County of Residence.

The Vocabulary Authoring 200 component may be plugged-in to a development environment software package that in turn interacts with one or more users via a display, keyboard, mouse, and other computer peripherals.

Figure 6:
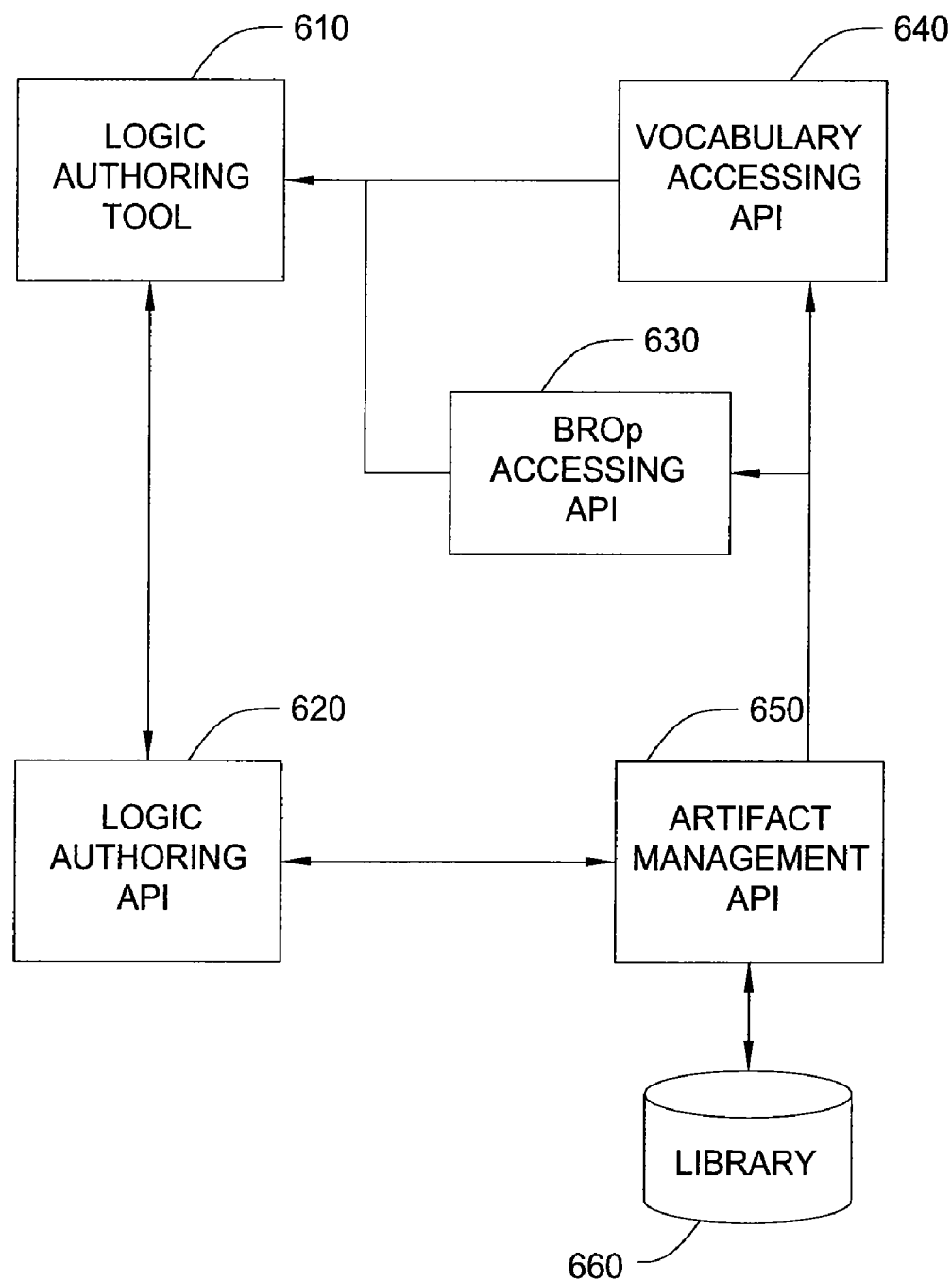
FIG. 6 is a block diagram showing a logic authoring component.

Referring now to FIG. 6, a block diagram shows the constituent parts of a Logic Authoring 600 component (also, the Logic Authoring 160 component of FIG. 1). Shown are Logic Authoring Tool 610, Logic Authoring API 620, BROp Accessing API 630, Vocabulary Accessing API 640, Artifact Management API 650 and Library 660. The vocabulary utilized was defined using the Vocabulary Authoring 140 component in order to author rules in terms that the target audience is familiar with.

The Logic Authoring 600 component allows a user to essentially write rules in their language (e.g., English, French, Chinese, etc.). For example, the rule may be "[i]f the Day of the Week is Tuesday then give the Customer a 15% discount." This type of user-friendly rule language may be more comfortable for a business user to use than a low-level programming language. The Logic Authoring 600 component uses the previously defined vocabulary produced by the Vocabulary Authoring 140 component to facilitate a user interfacing with a UI to write text in a form that is comfortable to the user in order to produce executable logic (i.e., logic that a computer can carry out).

The purpose of the Logic Authoring 600 component is to present a user friendly environment to the target audience, which may be a "business" user who wishes to author executable business logic, but does not necessarily have programmer expertise.

The present invention, through employment of strongly typed vocabulary terms, facilitates syntactic checks so that and errors are caught early at development time rather than later at runtime. Vocabulary terms available to the rule author are tailored with respect to language (e.g., presenting an English text description in place of a programming language statements), visibility (displaying and making available only those vocabulary terms whose underlying programming language statements are relevant to the target audience), and organization (facilitating rearrangement of vocabulary terms by domain, not necessarily the same as the underlying programming language statements' organization).

The Logic Authoring Tool 610 utilizes the Vocabulary Accessing API 640 to obtain the nouns, verbs, and sentence fragments for the one or more domains to which a user is interested and permitted. The nouns, verbs, and sentence fragments of the customized vocabulary were previously created by use of the Vocabulary Authoring 200 (of FIG. 2) component of the present invention and are obtained from the Library 660 via the Artifact Management API 650. In addition, built-in vocabulary is also available by way of the Vocabulary Accessing API 640 (equals, less than, less than or equals, . . . , and, or, add, subtract, multiply, . . . , time, date, . . . ).

The Logic Authoring Tool 610 may present available vocabulary terms for use as input and/or output for use in creation, by way of a Logic Authoring API 620, of a Rule Set, which is a collection of Rules having the same input, output, and evaluation segment.

Alternatively or in conjunction, the BROp Accessing API 630 can be utilized to discover, consider and perhaps model the input to and/or output from a Rule Set based upon a previously defined Rule Set, logical operation or PoV.

Once the input and output to a Rule Set is established by the Logic Authoring Tool 610, the user may then create, by way of a Logic Authoring API 620, one or more Rules to be contained with the Rule Set. When creating a Rule, only the vocabulary chosen by the user as input to and output from the Rule Set as well as any associated or related nouns, verbs, and sentence fragments may be displayed by the Logic Authoring Tool 610. The vocabulary for authoring a Rule is thus scoped according to the inputs, outputs and related vocabulary terms. A user may construct a Rule by using the Logic Authoring Tool 610 to manipulate the now limited (by user choice of input and output) vocabulary of terms, plus some built-in vocabulary available by way of the Vocabulary Accessing API 640. Once a Rule or a Rule Set is satisfactory to the "business" user of the Logic Authoring Tool 610, the created or modified "business" logic artifacts are preserved in the Library 660 via the Artifact Management API 650.

Figure 7:
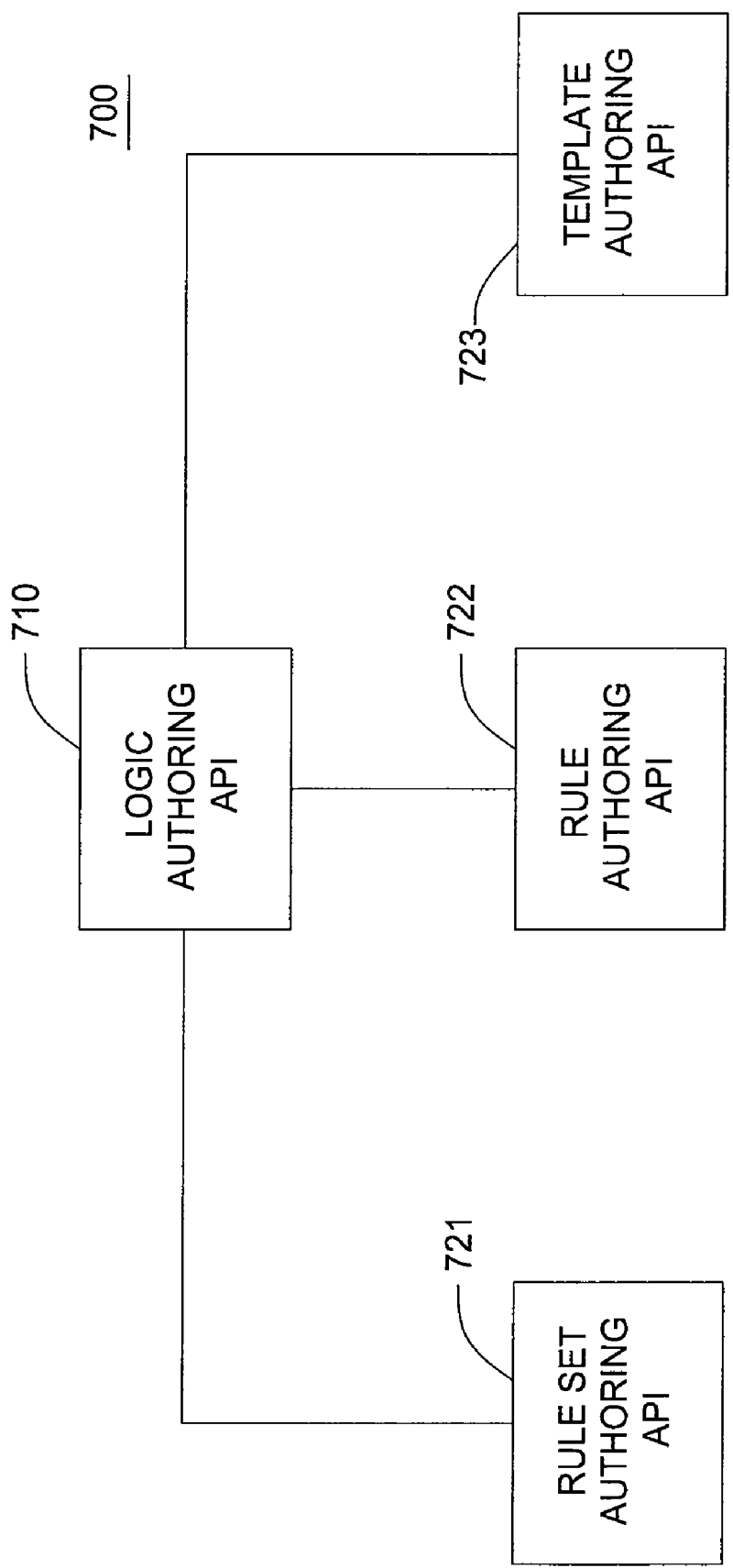
FIG. 7 is a block diagram showing logic authoring sub-components.

Referring now to FIG. 7, a block diagram shows the constituent parts of a Logic Authoring API 710 (also, the Logic Authoring API 620 of FIG. 6). Shown are Logic Authoring API 710, and its constituent parts, a Rule Set Authoring API 721, a Rule Authoring API 722 and a Template Authoring API 723. FIG. 7 illustrates logic authoring subcomponents.

The Rule Set Authoring API 721 controls the lifecycle operations for a Rule Set and can be employed by tools wishing to create, retrieve, update, and delete same, such as the Logic Authoring 610 (of FIG. 6) tool. A Rule Set is comprised of input requirements, output requirements, individual rules, and individual templates.

The Rule Authoring API 722 controls the lifecycle operations for a Rule and can be employed by tools wishing to create, retrieve, update, and delete same, such as the Logic Authoring 610 (of FIG. 6) tool. A Rule is comprised of a syntactically correct and possibly compound sentence formed from vocabulary terms. Rules can be created from scratch (e.g., by starting with just vocabulary terms and synthesizing sentences) or by replacing template terms in a Rule Template.

The Template Authoring API 723 controls the lifecycle operations for a Template and can be employed by tools wishing to create, retrieve, update, and delete same, such as the Logic Authoring 610 (of FIG. 6) tool. A Template is comprised of a Rule that has one or more nouns, verbs, and sentence fragments identified as substitutable. Later, Rules can be created from Templates by performing the identified substitutions. A Template has the same structure as a Rule, except the values of the various nouns, verbs and sentence fragments have been left unspecified. Later, Rules can be created from Templates by giving values to the pieces of Templates previously left unspecified.

The present invention facilitates template creation by allowing selection of an existing rule to be templated, and selection of parts of the rule to be specified later at template completion time (e.g., rule creation from template). Further, the valid values that can be substituted for the yet to be specified rule parts can also be designated. Moreover, the substitutable rule parts can be assigned textual representations for later display to the rule-from-template author. For example, a rule might be "if the customer is GOLD then give a 10% discount," and might be templated as "if the customer is <STATUS> then give a <PERCENTAGE> discount." The choices for <STATUS> might be designated as GOLD, SILVER, or BRONZE. The choices for <PERCENTAGE> might be designated as 5, 10, 15, 20 or 25. Later, at rule-from-template authoring time, only those parts of a templated rule that have been so designated can (and must) have valid values chosen from those previously specified. Continuing the above example, for <STATUS> one of GOLD, SILVER or BRONZE must be chosen. For <PERCENTAGE>, one of 5, 10, 15, 20 or 25 must be chosen. One skilled in the related art can contemplate these and other valid value substitution schemes, such as ranges (e.g., Integer between 5 and 25 inclusive) and other patterns.

Figure 8:
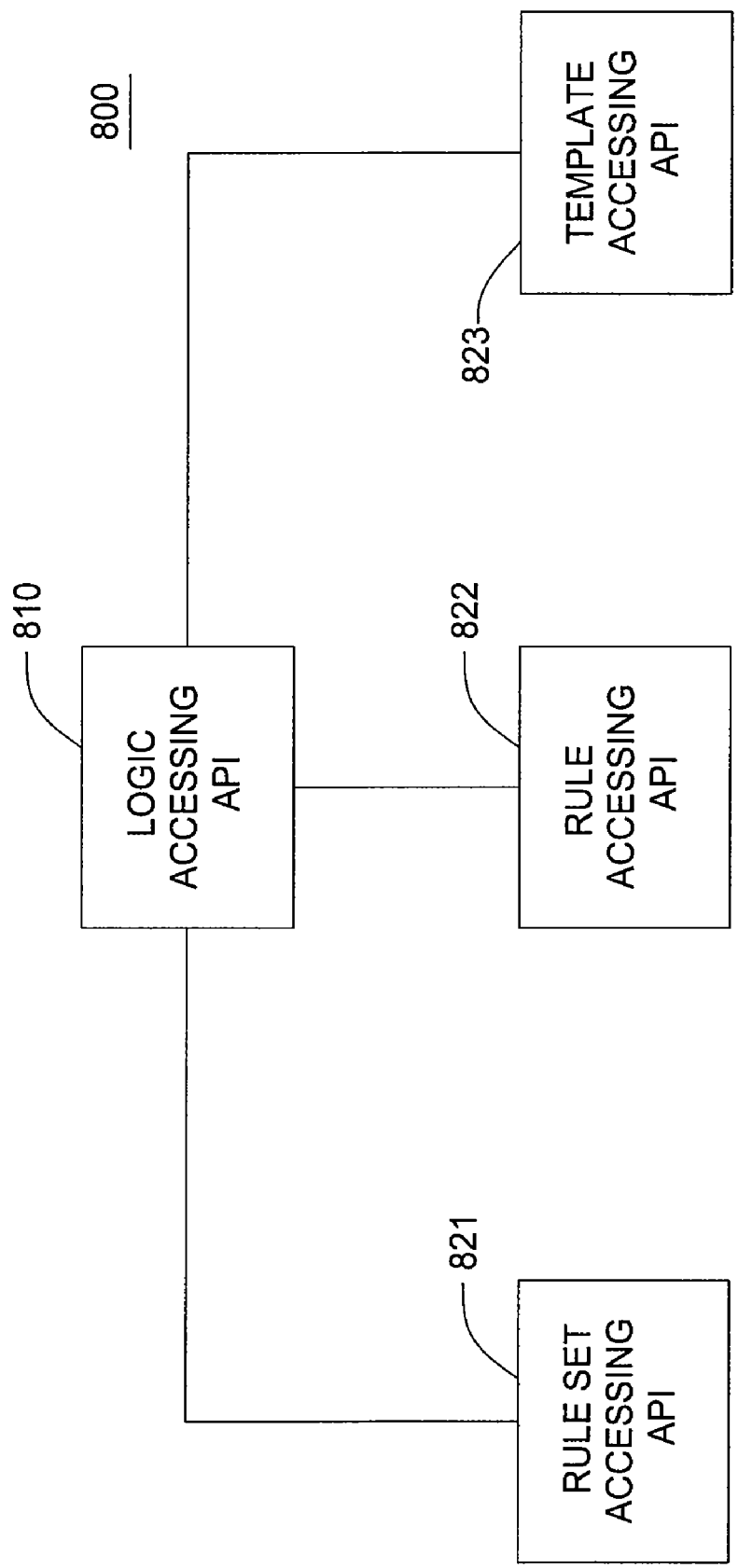
FIG. 8 is a block diagram showing logic accessing sub-components.

Referring now to FIG. 8, a block diagram shows the constituent parts of a Logic Accessing API 810, which comprises a subset of the Logic Authoring API 710 (of FIG. 7). Shown are Logic Accessing API 810 and its constituent parts, a Rule Set Accessing API 821, a Rule Accessing API 822 and a Template Accessing API 823. The only lifecycle operation provided is Retrieve, and is intended for use by browsers wishing to view but not alter the representation of authored logic. In particular, these interfaces are useful to the Code Generation Tool 910 (of FIG. 9). Some data according to aspects of the present invention can be read-write (as in FIG. 7) data and some data can be read-only data (FIG. 8).

One skilled in the art can contemplate other access mechanisms that allow some different combination of read and write capabilities for all the APIs specified by the present invention.

Figure 9:
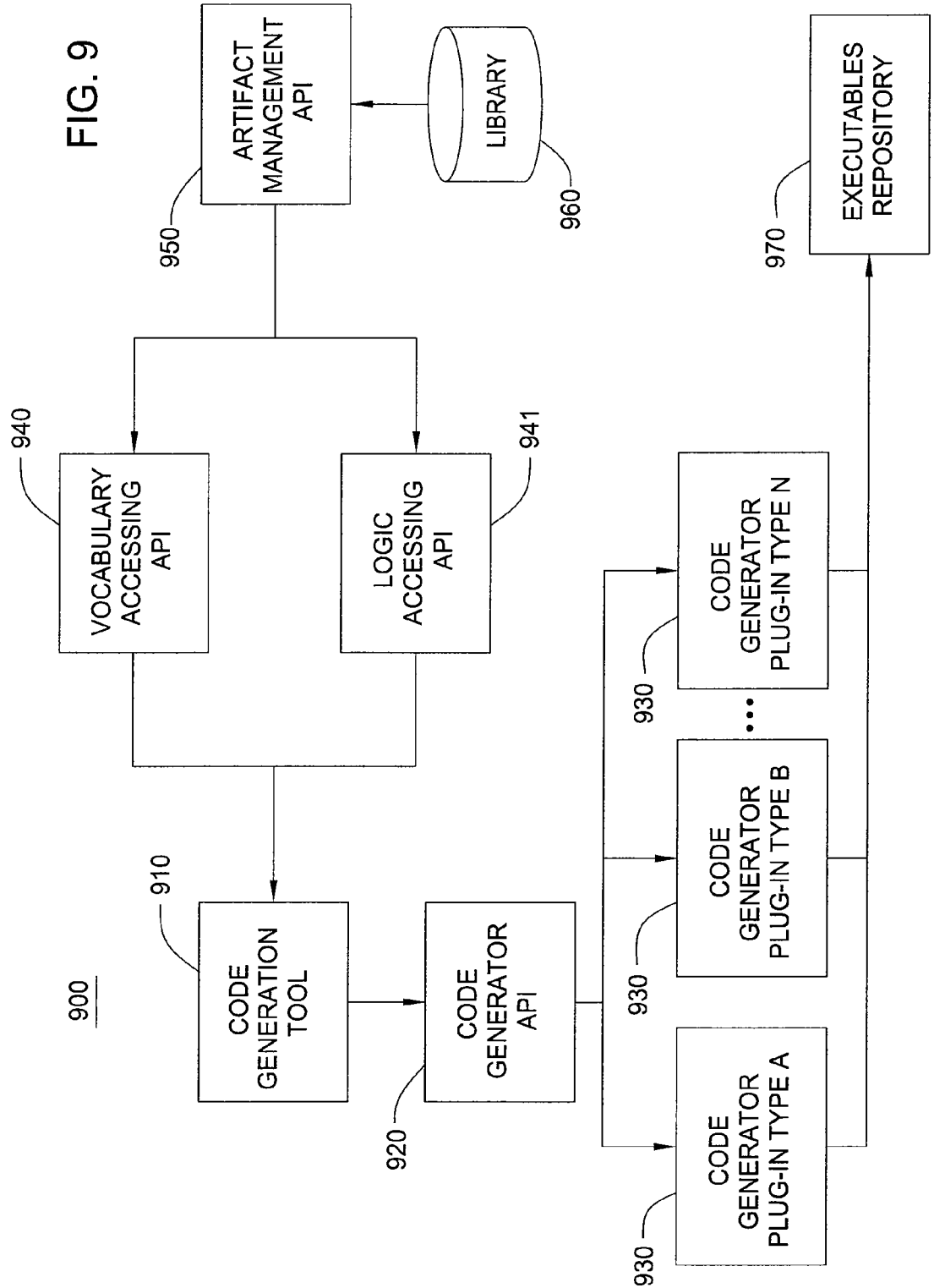
FIG. 9 is a block diagram showing an executable logic generation component.

Referring now to FIG. 9, a block diagram shows the constituent parts of a Code Generation 900 component (also, the Code Generation to Executables 170 component of FIG. 1). Shown are a Code Generation Tool 910, a Code Generator API 920, a Code Generator Plug-in Types A - N 930, a Vocabulary Accessing API 940, a Logic Accessing API 941, Artifact Management API 950, Library 960 and an Executables Repository 970. Once the vocabulary authoring and logic authoring phases are complete, then the next phase is to produce code that a computer can execute. Each of the phases are incremental, meaning that additional vocabulary terms can be added, additional rules sets can be authored, rules can be deleted or modified, and so forth, prior to each code generation and deployment.

The Code Generation 900 component transforms "business" user authored logic into an executable form based on the target execution environment. The Code Generation Tool 910 receives commands (from a human, or machine) to perform a transformation for one or more Rules Sets comprising Rules and/or Templates to one or more target environments. In one preferred embodiment, the Code Generation Tool 910 presents a list of available Rule Sets from which to choose; the user selects one or more of these Rule Sets; the user selects a target environment (perhaps Java); the user indicates to proceed with code generation; the Code Generation Tool 910 produces a suitable deployable entity (e.g., Java class files).

In order to present a list of available Rule Sets, the Code Generation Tool 910 utilizes the Logic Accessing API 941 to retrieve relevant artifacts from the Library 960 via the Artifact Management API 950. Once the Rule Set(s) to be transformed into executable form have been identified, the Code Generation Tool 910 utilizes Vocabulary Accessing API 940 to manufacture executable statements corresponding to the sentences of vocabulary terms specified in the "business" user authored logic. The transformation is accomplished by utilizing the Code Generator API 920 with the Code Generator Plug-in Type(s) 930 appropriate for the target environment(s) to produce executable form(s) for the Executables Repository 970.

In one embodiment, in place of code generation, runtime interpretation is employed with the main trade-offs being speed and flexibility.

Embodiments according to the present invention capture information (Resources, Rule Sets, Rules, Templates and the like) in a standardized form. This form can be utilized to generate code for a variety of target platforms or can be interpreted at runtime. In one embodiment, object type conversions, resolution of complicated resource structures and inter-resource relationships, and cross-mapping of resources and operations on collections are transformed into executable code. Validity checks, mismatched operands, missing operands, and other illegal occurrences are provided to interested parties, such as the Logic Authoring 160 component, by the Code Generation to Executables 170 component through the Code Generator Tool 910 and Code Generator API 920.

Referring now to FIG. 10, a block diagram shows the constituent parts of a Logic Deployment Facility 1000 (also, Deploy 171 of FIG. 1) component. Shown are an Executables Deployment Tool 1010, an Executables Deployment API 1020, a Runtime Engine 1030 (also 130 of FIG. 1), a Data Store 1040 and an Executables Repository 1050 (also 970 of FIG. 9). The result of FIG. 9 was to produce the Executables Repository 970 (this was a translation into something that a computer can use). With respect to FIG. 10, it is described how embodiments according to the present invention take that information and deploy it to a runtime environment so the information can actually be used.

The Executable Deployment Facility 1000 provides an Executables Deployment tool 1010 that accesses one or more deployable entities located in the Executables Repository 1050. The Executables Deployment tool 1010 then uses the transaction-safe lifecycle operations provided by the Executables Deployment API 1020 to create to, retrieve from, update to, and/or delete from the Runtime Engine 1030, which in turn updates its own representation in its Data Store 1040.

A first deployment initializes the Data Store 1040 of the Runtime Engine 130 with "business" user authored logic in executable form. Subsequent deployments may add new logic, update existing logic, or remove old logic in a transaction-safe manner so that any processes that are in progress have a consistent view.

Figure 3:
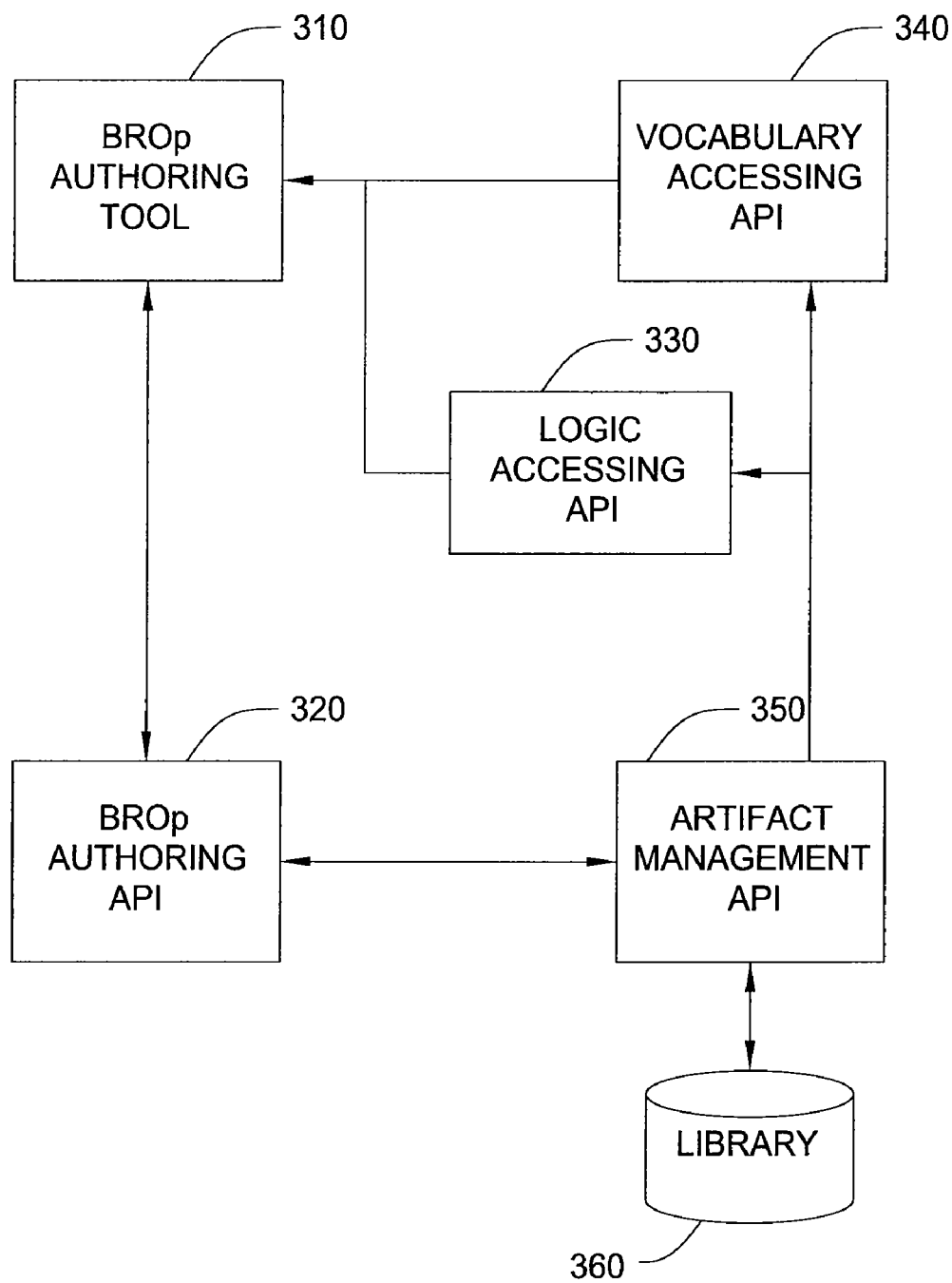
FIG. 3 is a block diagram showing an application connectivity definition component.

Referring now to FIG. 3, a block diagram shows the constituent parts of a BROp Authoring 300 (also, BROp Authoring 150 component of FIG. 1) component. Shown are BROp Authoring Tool 310, BROp Authoring API 320, Logic Accessing API 330, Vocabulary Accessing API 340, Artifact Management API 350 and Library 360.

In one embodiment, two items are created using the BROp Authoring 300 component. One item created is a logical operations registry that is available to applications to use in order to connect with the rule Runtime Engine 130. Another item created is a group of one or more interfaces, or code stubs, that is included with an application in order to make a type-safe call to the authored logic. (See U.S. Patent having "System and Method for Employing Externalized, Dynamically Configurable, Cacheable Trigger Points," to Degenaro et al., filed Sep. 20, 2001, which is incorporated herein by reference.)

The purpose of the BROp Authoring 300 component is to manage logical operations in the form of "contracts" that are agreed to by both PoVs within applications and "business" user authored externalized functions. This provides type-safety, so that the client (PoV) and service (Rule Set) agree on input and output expectations. But it also allows flexibility in that a PoV need not directly link to an externalized function. This allows for substitution of one externalized function for another by a BROp mediator, so long as the "contract" is satisfied. The binding between client (PoV) and service (Rule Set) can be dynamically determined at runtime by evaluation of selection criteria.

For example, one contract, let's call it "Signature1," might be that the input is (String, Integer), the output is (Double), and the purpose is "Calculate Discount". A PoV having contract "Signature1" could be linked by the BROp mediator to any externalized function also having contract of "Signature1".

One such mediation function is by date. For example, between times (t0, t1), the BROp mediator might route to externalized function EF1; between times (t1, t2) the BROp mediator might route to externalized function EF2; and so forth.

The BROp Authoring Tool 310 utilizes the Logic Accessing API 330 and the Vocabulary Accessing API 340 to present the user with information for defining logical operations. The Logic Accessing API 330 is used to list available authored Rules Sets so that one can be chosen as a model (input, output and purpose) for creating a logical operation (BROp). Alternatively or in conjunction, existing PoVs and/or existing logical operations can be chosen as a model; or the Vocabulary Accessing API can be utilized to formulate a new contract.

Logical operations lifecycle activities are carried out via the BROp Authoring API 320. The BROp Authoring Tool 310 can display existing logical operations obtained by retrieval through the BROP Authoring API 320, as well as create new or update existing logical operations according to user specifications, and to delete obsolete ones.

Referring now to FIG. 4, a block diagram shows the constituent parts of a BROp Deployment 400 (also, 151 of FIG. 1) component. Shown are BROp Deployment Tool 410, BROp Deployment API 420, BROp Registry 430 (also 120 of FIG. 1), Data Store 440, BROp Accessing API 450, Artifact Management API 460 and Library 470.

The work performed in FIG. 3 can now be made useable for the runtime environment. The purpose of the BROp Deployment 400 component is to take logical operations defined on the development platform and deploy them to the production system in the form of a BROp Registry 430. The deployment task is performed in a transactionalized manner, so that processes in progress do not experience any anomalies.

The BROp Deployment Tool permits a user (human or machine) to identify those BROp entities in the development system to be deployed, and then deploys them using the BROp Deployment 420 API, which updates the BROp Registry 430, which in turn updates its Data Store 440. The logical operations available for deployment in the development system are discovered through use of the BROp Accessing API 450, which in turn utilizes the Artifact Management API 460 to retrieve from the Library 470.

Once deployed, the BROp Registry 430 runtime component contains pluggable logic to mediate PoV requests, in the form of context-driven logical operation invocations, with available externalized functions. Mediations may occur through a direct program call, through one or a group of Web services, or through some other invocation patterns.

BROp Registry deployments can initialize an empty registry, replace an existing registry, update (add to and/or delete from) an existing registry, or clear an existing registry.

Referring now to FIG. 5, a block diagram shows the constituent parts of a PoV Generation 500 component. Shown are BROp Application Connector Tool 510, BROp Connection Generator API 520, BROp Connection Generator Plug-ins A-N 530, BROp Accessing API 540, Artifact Management API 550, Library 560 and Application Connection Repository 570. FIG. 5 illustrates an exemplary process for producing the type-safe linkage for the Extended Application 110.

A BROp accessing API is used by the BROp Application Connector Tool 510. This allows a user to pick and choose those logical operations that are of interest. A user selects a particular logical operation that the user wants to perform, such as "Calculate Discount" or any other logical application that is defined. Upon choosing a particular logical operation, it is known what the expected inputs and outputs are. The system can then customize for the Extended Application 110 (Java, C++, Web Service call or the like). By examining the logical operation signature the system can generate the right code stub or interface for the Extended Application 110 to use in order to connect with the corresponding logical operation at runtime. This tool, through the Connection Generator API 520, uses one of the connection generator plug-ins (one for Java, one for C++, Web Services, etc.) in order to generate that code stub and/or other artifacts. Then Application Connection Repository 570 stores what was produced and at runtime the Extended Application 110 uses one or more of what was produced to type-safely connect to the logical operation that is desired.

The purpose of the BROp Application Connector 500 component is to connect applications to executable forms of "business" user authored logic in a type-safe manner. A BROp Application Connector Tool 510 uses the BROp Accessing API 540 to obtain one or more BROp logical operations, defined through use of the BROp Authoring 300 component, from the Library 560 by way of the Artifact Management API 550.

The user of the BROp Application Connect Tool 510 (human or machine) identifies those logical operations for which a PoV is to be created, and PoV target platform. It then utilizes the Code Generator API 520, which in turn utilizes the corresponding Code Generator Plug-in Type(s) to create the desired PoV(s).

For example, one target platform might be Java. The Code Generator API 520 would utilize the corresponding Code Generator Plug-in 530 to generate a Java code stub into the file system (Application Code Repository 570) appropriate to the logical operation.

A logical operation can be re-used to produce multiple PoV generated artifacts. For example, a logical operation called "CalculateDiscount" may result in a first type-safe PoV having a Java class of Discount, a method name of calculate that consumes (Integer, String) and produces Double; a second type-safe PoV for the same logical operation may have a C++ class of Externalized and a method name of calculateDiscount.

Embodiments according to the present invention have several non-obvious advantages over other systems, as mentioned herein. An advantage of the present invention is a method for the composition and employment of a customized vocabulary of resources, which are expectedly defined by programmers under the direction of business user advocates. This step transforms entities from a programmer's world to a business user's world, enabling business users to manipulate entities in their own terms (e.g., individualized language). The original entities are known as actual resources, and the transformed entities are known as virtual resources. (See U.S. patent application Ser. No. 10/665,564, entitled "Virtual Resources Method, System and Service," to Degenaro et al., filed Sep. 22, 2003, which is incorporated herein by reference.)

Another advantage of the present invention is a method for the composition and employment of individualized language based rules and rule sets that interact with resources from a customized vocabulary. This method permits non-programmers to express the desired tests and actions that should be performed using individualized language. The present invention essentially grants non-programmers the ability to program using an individualized language instead of having to learn a programmer-oriented language.

Another advantage of the present invention is the capability to transform individualized language authored rules into computer executable format. This permits the business user rules, expressed in individualized language terms, to be performable by machine execution. The translation is from individualized language format to one or more target execution engine formats. A code generator can produce artifacts suitable for Java, ABLE and other targets.

Yet another advantage of the present invention is the means to deploy and execute code that carries out a business user's individualized language instructions. Once deployed, applications that have been extended to employ rules are influenced by expressions written in individualized language by a business user without any need for programmer assistance.

An advantage of the present invention is the capability to organize resources from a customized vocabulary and individualized language rules into individualized language rule sets comprising inputs and outputs, and one or more rules all specified by the business user using individualized language.

Other rule authoring advantages include the ability to create an individualized language rule template based on a previously authored rule and the ability to author an individualized language rule by completing an individualized language rule template.

Another advantage of the present invention is the ability of the template/rule/rule set authoring component to enforce correct individualized language syntax, so that authors cannot make a syntactic mistake. This insures that whatever a business user authors can indeed by executed by a runtime. Note, however, that logic mistakes such as "give a discount of 200%" are not prevented.

Another advantage of the present invention is the facility to scope template/rule authoring based on rule set input and output groups.

Yet another advantage of the present invention is the capacity to represent customized vocabulary resources and individualized language templates, rules and rule sets in a persistent externalized XMI format that can be interrogated and manipulated by other as of yet unimagined components.

An advantage of the present invention is a facility to create application program type-safe linkage and registration, based on the resources from a customized vocabulary used as inputs and produced as outputs, for a desired individualized language rule set model.

Another key advantage of the present invention is the means to deploy artifacts suitable for runtime of individualized language rule set selection based upon externalized criteria, such as time. For example, from 2003/01/01-2003/12/31 the link from the application will be to individualized language rule set "A," whilst from 2004/01/01 and beyond the link will be to individualized language rule set "B." This permits a type-safe level of indirection for individualized language rule set selection.

Another advantage of the present invention is the ability for applications to employ individualized language rules to influence their behavior. This is made possible by extending applications with requests for individualized language rule-based guidance, which may either directly or indirectly cause one or more individualized language rules to be triggered.

Yet another advantage of the present invention is the ability to coordinate and cooperate with other rules engines in the runtime execution.

Figure 13:
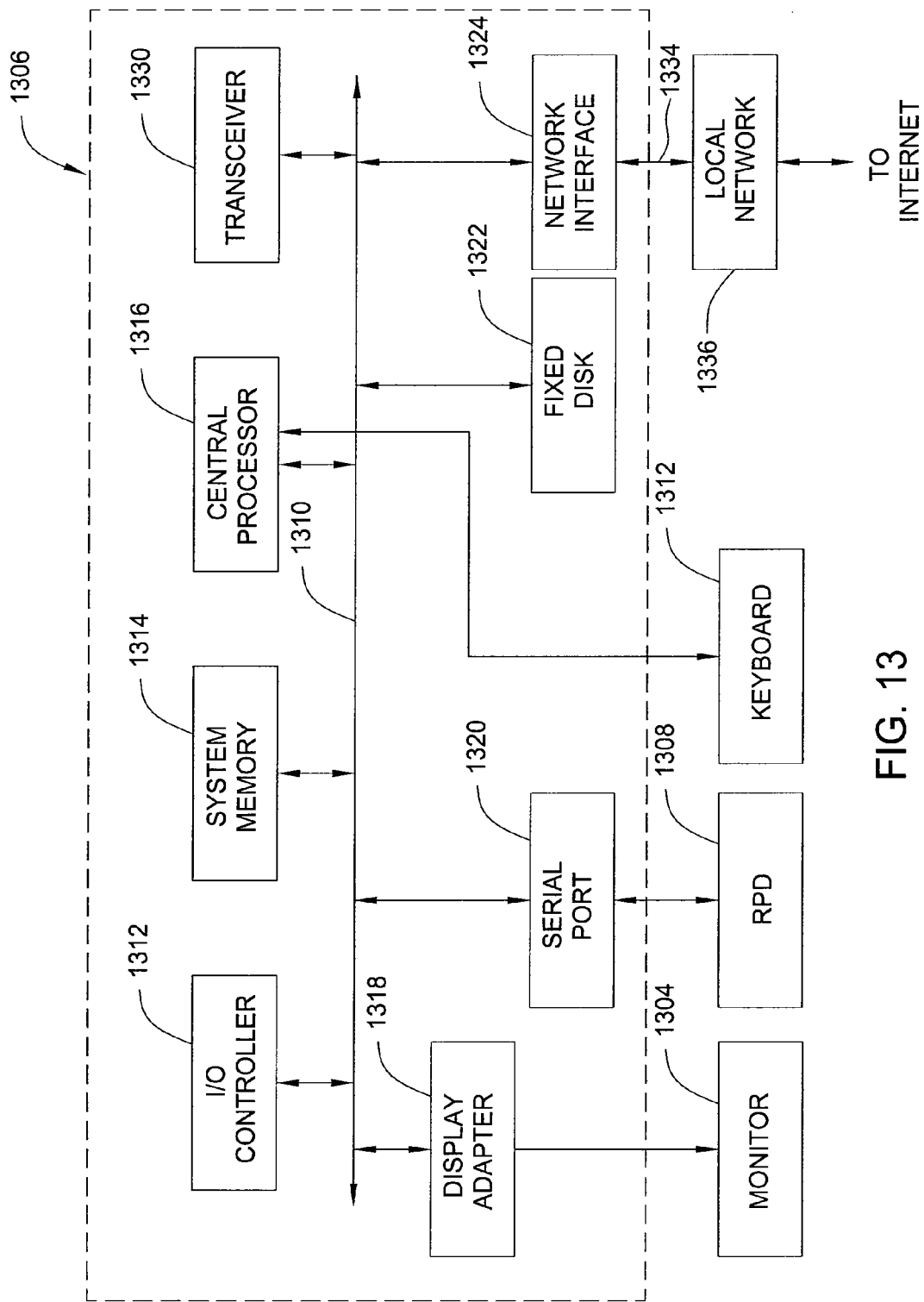
FIG. 13 illustrates subsystems found in one exemplary computer system that can be used in conjunction with embodiments according to the present invention.

FIG. 13 illustrates subsystems found in one exemplary computer system, such as a computer system 1306, which can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within the computer system 1306 are directly interfaced to an internal bus 1310. The subsystems include an input/output (I/O) controller 1312, a system random access memory (RAM) 1314, a central processing unit (CPU) 1316, a display adapter 1318, a serial port 1320, a fixed disk 1322 and a network interface adapter 1324. The use of the bus 1310 allows each of the subsystems to transfer data among the subsystems and, most importantly, with the CPU 1316. External devices can communicate with the CPU 1316 or other subsystems via the bus 1310 by interfacing with a subsystem on the bus 1310.

FIG. 13 is merely illustrative of one suitable configuration for providing a system in accordance with the present invention. Subsystems, components or devices other than those shown in FIG. 13 can be added without deviating from the scope of the invention. A suitable computer system can also be achieved without using all of the subsystems shown in FIG. 13. Other subsystems such as a CD-ROM drive, graphics accelerator, etc., can be included in the configuration without affecting the performance of the computer system 1306.

One embodiment according to the present invention is related to the use of an apparatus, such as the computer system 1306, for implementing a system according to embodiments of the present invention. The CPU 1316 can execute one or more sequences of one or more instructions contained in the system RAM 1314. Such instructions may be read into the system RAM 1314 from a computer-readable medium, such as a fixed disk 1322. Execution of the sequences of instructions contained in the system RAM 1314 causes the CPU 1316 to perform process steps, such as the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the CPU 1316 for execution. Such media can take many forms, including, but not limited to, storage media and transmission media. Storage media include, for example, optical or magnetic disks, such as the fixed disk 1322. Storage media include dynamic memory, such as the system RAM 1314. Transmission media include coaxial cables, copper wire and fiber optics, among others, including the wires that comprise one embodiment of the bus 1310. Transmission media can also take the form of acoustic or light waves, such as those generated during radio frequency (RF) and infrared (IR) data communications. Common forms of computer-readable storage media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, or any other storage medium from which a computer can read.

Various forms of computer-readable media may be involved in carrying one or more sequences of one or more instructions to the CPU 1316 for execution. The bus 1310 carries the data to the system RAM 1314, from which the CPU 1316 retrieves and executes the instructions. The instructions received by the system RAM 1314 can optionally be stored on the fixed disk 1322 either before or after execution by the CPU 1316.

While the foregoing is directed to the illustrative embodiment of the present invention, other and further embodiments of the invention may be devised without departing from the basic scope thereof, and the scope thereof is determined by the claims that follow.

The invention claimed is:

1. A system for authoring and executing an individualized language business rule, the system comprising:
    means for creating a plurality of individualized vocabularies, each of the plurality of individualized vocabularies comprising at least one individualized vocabulary term that is a noun, a verb, or a sentence fragment, said at least one individualized vocabulary term being mapped onto at least one executable object;
    means for creating the individualized language business rule, where the individualized language business rule references at least one individualized vocabulary term from one of said plurality of individualized vocabularies, where said means for creating the individualized language business rule comprises:
        means for receiving a selection from an end-user of said one of the plurality of individualized vocabularies;
        means for creating a rule set input group and a rule set output group, each of the rule set input group and the rule set output group comprising individualized vocabulary terms that are available to the end-user for building the individualized language business rule, where the individualized vocabulary terms are limited to individualized vocabulary terms contained in the one of said plurality of individualized vocabularies that was selected by the end-user such that at least one of the rule set input group and the rule set output group includes the at least one individualized vocabulary term from the one of said plurality of individualized vocabularies;
        means for creating at least one individualized rule template; and
        means for creating at least one individualized rule from said at least one individualized rule template, based on end-user-selected inputs and outputs to the individualized rule template, the end-user-selected inputs and outputs being selected by the end-user from the rule set input group and the rule set output group, respectively, where at least one of the end-user-selected inputs and the end-user-selected outputs includes the at least one individualized vocabulary term from the one of said plurality of individualized vocabularies;
    means for organizing said at least one individualized vocabulary term from said one of said plurality of vocabularies and said at least one individualized language business rule into at least one individualized language rule set; and
    means for transforming said at least one individualized language business rule into computer executable format, wherein at least one of: said means for creating a plurality of individualized vocabularies, said means for creating the individualized language business rule, said means for organizing, or said means for transforming is implemented by a processor.

2. The system of claim 1, wherein the means for creating at least one individualized language business rule referencing at least one of said individualized vocabulary term from one of said plurality of individualized vocabularies further comprises means for preventing a syntactically incorrect individualized language statement from being authored.

3. The system of claim 1, further comprising means for deploying said at least one transformed executable to a runtime environment and executing said at least one transformed individualized language business rule.

4. The system of claim 3, further comprising means for executing at least one non-individualized language business rule.

5. The system of claim 3, further comprising means for coordinating and cooperating by a runtime engine with other rules engines in a runtime environment.

6. A computer-readable storage medium for authoring and executing an individualized language business rule, which when executed by a processor performs steps of:
    creating a plurality of individualized vocabularies, each of the plurality of individualized vocabularies comprising at least one individualized vocabulary term that is a noun, a verb, or a sentence fragment, said at least one individualized vocabulary term being mapped onto at least one executable object;
    creating the individualized language business rule, where the individualized language business rule references at least one individualized vocabulary term from one of said plurality of individualized vocabularies, where said creating the individualized language business rule comprises:
        receiving a selection from an end-user of said one of the plurality of individualized vocabularies;
        creating a rule set input group and a rule set output group, each of the rule set input group and the rule set output group comprising individualized vocabulary terms that are available to the end-user for building the individualized language business rule, where the individualized vocabulary terms are limited to individualized vocabulary terms contained in the one of said plurality of individualized vocabularies that was selected by the end-user such that at least one of the rule set input group and the rule set output group includes the at least one individualized vocabulary term from the one of said plurality of individualized vocabularies;
        creating at least one individualized rule template; and
        creating at least one individualized rule from said at least one individualized rule template, based on end-user-selected inputs and outputs to the individualized rule template, the end-user-selected inputs and outputs being selected by the end-user from the rule set input group and the rule set output group, respectively, where at least one of the end-user-selected inputs and the end-user-selected outputs includes the at least one individualized vocabulary term from the one of said plurality of individualized vocabularies;
    organizing said at least one individualized vocabulary term from said one of said plurality of vocabularies and said at least one individualized language business rule into at least one individualized language rule set; and transforming said at least one individualized language business rule into computer executable format.

7. The computer-readable media of claim 6, wherein creating at least one individualized language business rule referencing at least one of said individualized vocabulary term further comprises preventing a syntactically incorrect individualized language statement from being authored.

8. The computer-readable media of claim 6, further comprising deploying said at least one transformed executable to a runtime environment and executing said at least one transformed individualized language business rule.

9. The computer-readable media of claim 8, further comprising executing at least one non-individualized language business rule.

10. The computer-readable media of claim 8, further comprising coordinating and cooperating by a runtime engine with other rules engines in a runtime environment.

* * * * *